May 10, 1927.

H. F. SHINDEL

EXPANSIBLE EYE CUP

Filed Aug. 10, 1923

1,627,578

Harry F. Shindel, Inventor

Patented May 10, 1927.

1,627,578

UNITED STATES PATENT OFFICE.

HARRY F. SHINDEL, OF READING, PENNSYLVANIA, ASSIGNOR TO WILLSON GOGGLES INC., OF READING, PENNSYLVANIA, A CORPORATION OF PENNSYLVANIA.

EXPANSIBLE EYECUP.

Application filed August 10, 1923. Serial No. 656,678.

My invention relates particularly to goggle eye cups adapted to inclose the eye cavities and to removably clamp an inserted lens, such as are indicated in my prior Patent No. 1,269,707 issued March 11, 1919; the present invention providing a simple and economical construction which will enable very easy placing and removal of an engaged lens and being fully set forth in connection with the accompanying drawing and clearly defined in the subjoined claim.

Figure 1:
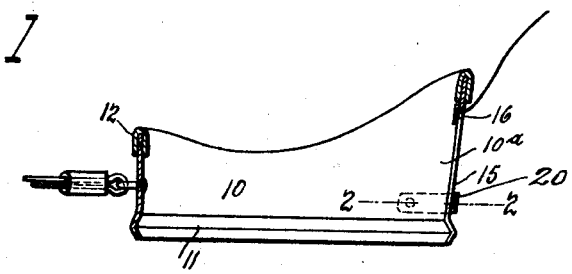
Figure 3:
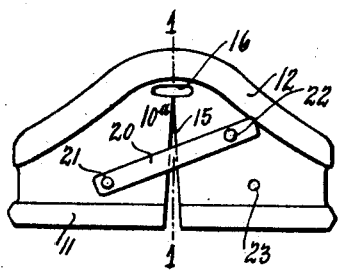

Fig. 1. is a sectional elevation, on the line 1—1 of Fig. 3, of an eye cup embodying my invention.

Figure 2:
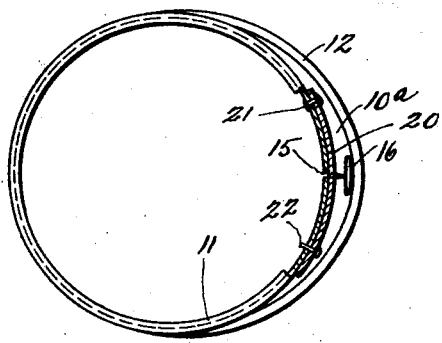

Fig. 2. is mainly a front view of the same, but with a portion broken away to show a section on the line 2—2 of Fig. 1.

Fig. 3. is an end elevation of the same, showing the locking device in released position and the lens-engaging rim expanded for removal or insertion of a lens.

The eye cup indicated is commonly made of tubularly shaped sheet material and comprises an approximately cylindrical wall portion 10 formed with an interiorly grooved circular lens-engaging rim 11 at its outer edge, and with a wave-line face-contacting rim 12 at its inner edge; the depth of the wall between said rims varying so as to adapt the rim 12 to that portion of a wearer's face which surrounds the eye socket, with the maximum wall depth at the outer portion 10ª of the cup.

In my improved cup the face-contacting rim 12 is beaded or reinforced as indicated so as to form a solid wave-line ring of substantial strength and rigidity; while the wall 10 of the cup together with its lens-engaging rim 11 is made expansible circularly, as limited by the relative rigidity of the integral face-engaging rim 12 but sufficiently to permit of enlarging said lens-engaging rim so as to place or remove a lens; this being accomplished by making a longitudinal split 15 in the deep portion 10ª of the wall, extending from an aperture 16 therein located adjacent the solid face-contacting rim 12, through the lens-engaging rim 11. This split enables said lens-engaging rim to be readily expanded sufficiently to engage or disengage the beveled rim of a lens, without undue straining of the solid face-contacting rim 12, the aperture 16 causing any strain upon the latter to be so distributed thereon as to avoid any danger of breaking the same while the resiliency thereof tends to normally close the rim 11 upon a placed lens. In order to positively retain the latter however against unintended displacement I provide a suitable locking device, consisting as shown of a spring clip 20 which is pivoted at one end 21 to the wall 10 at one side of the split, and is provided adjacent its other end with a pin 22 adapted to enter a locking wall-aperture 23 at the opposite side of the split when the split rim 11 is closed to properly clamp the lens. It will be readily seen that my present device enables very economical manufacture thereof while providing for very readily inserting or removing lenses.

What I claim is:

An eye cup having a non-expansible face-contacting rim and an expansible wall portion of varying depth with a lens-clamping rim; said wall having a split extending outwardly through said lens-clamping aim and being provided with pivotally movable means for locking the latter to retain an engaged lens.

In testimony whereof I affix my signature.

HARRY F. SHINDEL.